(12) United States Patent
Safarik

(10) Patent No.: US 9,079,698 B2
(45) Date of Patent: Jul. 14, 2015

(54) DUAL LASER SCORED BLISTER PACKAGE COVER

(75) Inventor: Kristy L. Safarik, Chicago, IL (US)

(73) Assignee: Wm. Wrigley Jr. Company, Chicago, IL (US)

( * ) Notice: Subject to any disclaimer, the term of this patent is extended or adjusted under 35 U.S.C. 154(b) by 375 days.

(21) Appl. No.: 12/994,020

(22) PCT Filed: May 20, 2009

(86) PCT No.: PCT/US2009/044660
§ 371 (c)(1),
(2), (4) Date: Dec. 22, 2010

(87) PCT Pub. No.: WO2009/143234
PCT Pub. Date: Nov. 26, 2009

(65) Prior Publication Data
US 2011/0262589 A1    Oct. 27, 2011

Related U.S. Application Data

(60) Provisional application No. 61/055,296, filed on May 22, 2008.

(51) Int. Cl.
| | | |
|---|---|---|
| *B65D 75/36* | (2006.01) | |
| *B65D 75/32* | (2006.01) | |
| *B65D 85/60* | (2006.01) | |
| *A61J 1/03* | (2006.01) | |
| *B32B 27/00* | (2006.01) | |

(52) U.S. Cl.
CPC ............... *B65D 75/327* (2013.01); *A61J 1/035* (2013.01); *B32B 27/00* (2013.01); *B65D 75/367* (2013.01); *B65D 85/60* (2013.01); *B65D 2575/3227* (2013.01); *B65D 2575/367* (2013.01)

(58) Field of Classification Search
CPC ..... A61J 1/035; B65D 75/327; B65D 75/367; B65D 75/366; B65D 2575/367; B65D 2575/3227; B65D 85/60
USPC ............... 426/108, 122, 5, 76, 115, 119, 126, 426/127, 394, 398; 206/531, 469, 532, 461, 206/467, 528
See application file for complete search history.

(56) References Cited

U.S. PATENT DOCUMENTS

| | | | | |
|---|---|---|---|---|
| 5,075,143 | A * | 12/1991 | Bekele | 428/36.5 |
| 5,229,180 | A * | 7/1993 | Littmann | 428/43 |
| 5,469,968 | A * | 11/1995 | Matthews et al. | 206/532 |
| 5,707,750 | A * | 1/1998 | Degrassi et al. | 428/475.8 |
| 6,041,930 | A * | 3/2000 | Cockburn | 206/484 |
| 6,116,782 | A * | 9/2000 | Arkins et al. | 383/202 |
| 6,802,422 | B2 * | 10/2004 | Kalvelage | 206/538 |

(Continued)

FOREIGN PATENT DOCUMENTS

WO      2007113850 A      10/2007

OTHER PUBLICATIONS

"Candy Warehouse" ("Bubble Dust"), pub. Apr. 15, 2003. http://web.archive.org/web/20030415044106/http://www.candywarehouse.com/bubbledust.html.*

(Continued)

*Primary Examiner* — Drew Becker
(74) *Attorney, Agent, or Firm* — Armstrong Teasdale LLP

(57) ABSTRACT

A rupturable blister package multilayer cover sheet has top (3) and bottom (4) layers having dual aligned laser scores (6,7) and at least one non-laser scored intermediate layer (15).

20 Claims, 5 Drawing Sheets

(56) References Cited

U.S. PATENT DOCUMENTS

| | | | |
|---|---|---|---|
| 2003/0231811 A1* | 12/2003 | Hodson et al. | 383/208 |
| 2005/0284789 A1* | 12/2005 | Carespodi | 206/461 |
| 2007/0116915 A1* | 5/2007 | Perre et al. | 428/43 |
| 2007/0235366 A1* | 10/2007 | Desai et al. | 206/531 |
| 2008/0230432 A1* | 9/2008 | Bobbett et al. | 206/531 |
| 2009/0145800 A1* | 6/2009 | Bowers et al. | 206/532 |
| 2011/0266189 A1* | 11/2011 | Tom et al. | 206/531 |
| 2013/0299499 A1* | 11/2013 | Elliott | 220/359.1 |
| 2013/0306511 A1* | 11/2013 | Branyon et al. | 206/469 |

OTHER PUBLICATIONS

International Search Report & Written Opinion for PCT/US2009/044660, dated Aug. 31, 2009, 9 pages.

* cited by examiner

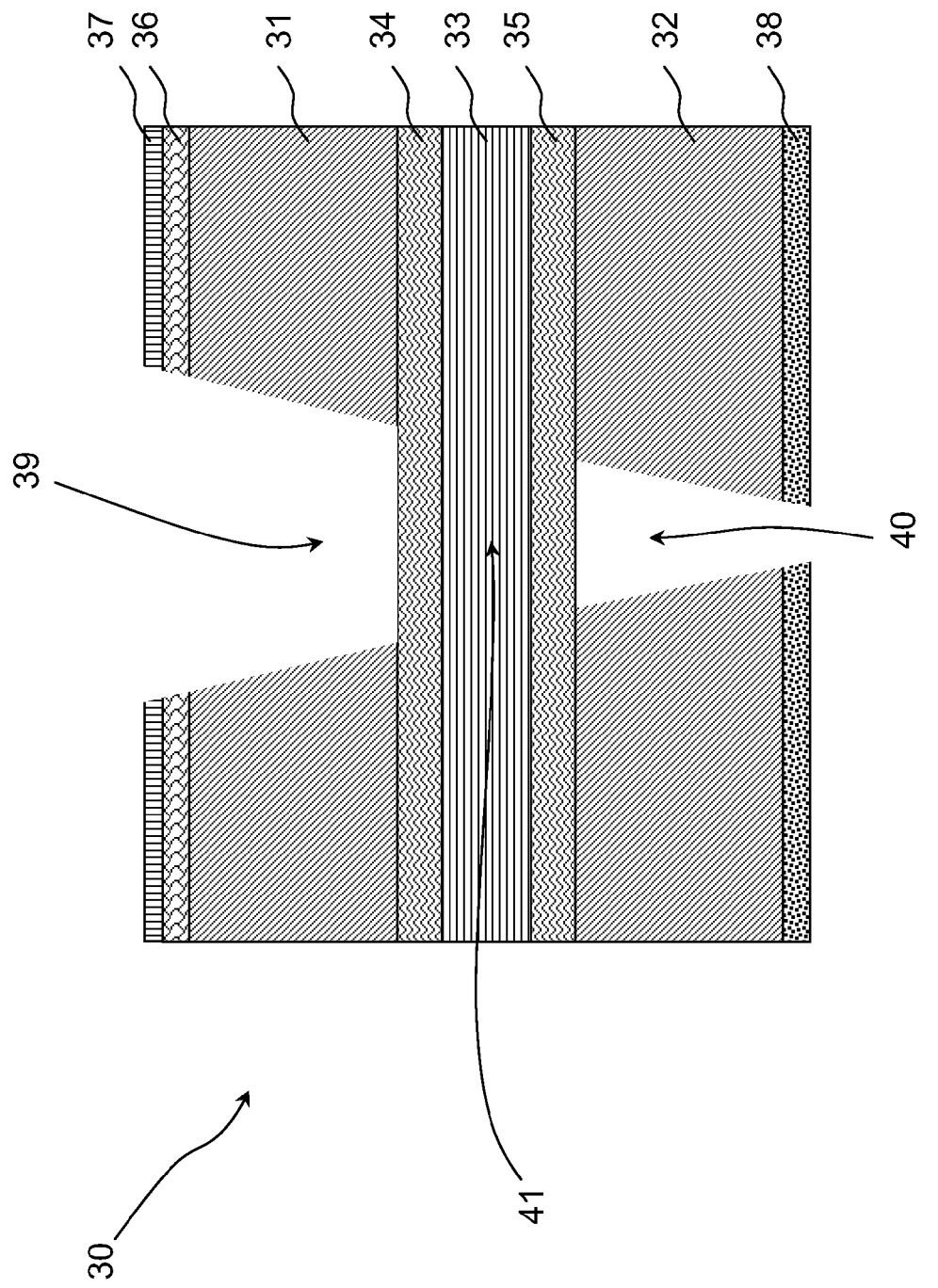

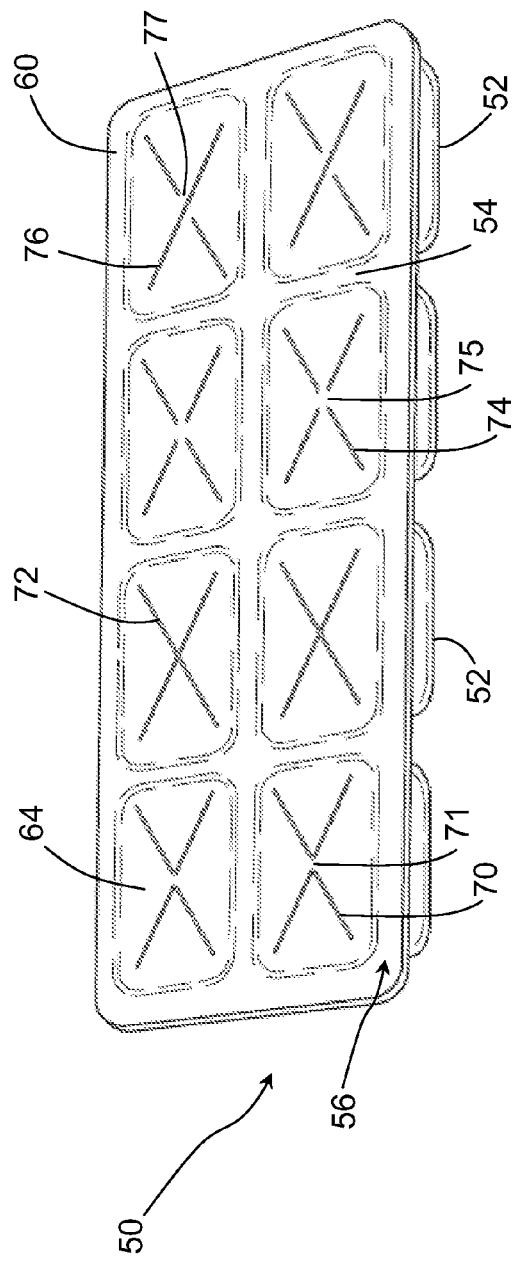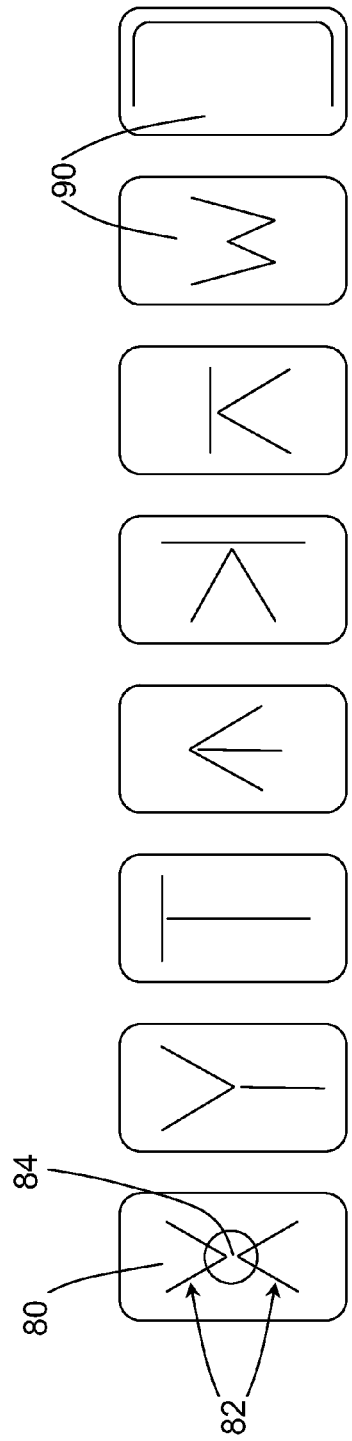

DUAL LASER SCORED BLISTER PACKAGE COVER

CROSS-REFERENCE TO RELATED APPLICATIONS

This application is a 35 U.S.C. §371 national stage application of PCT/US2009/044660, filed May 20, 2009, and additionally claims priority to U.S. Provisional Application No. 61/055,296, filed May 22, 2008.

BACKGROUND OF THE INVENTION

This invention relates to consumer blister packages and more particularly relates to consumer blister packages sealed with a dual laser-scored rupturable multilayered sheet.

Blister packages suitable for consumer use are well known. Conventionally, a consumer product is contained in a formed plastic bubble-shaped blister which is covered with a sheet of polymeric, foil, or foil laminated polymeric material. A consumer may remove the product from the blister package typically by peeling the cover sheet from the blister or pushing the product through the cover sheet by applying force to the blister. In order for a consumer to push a product through the cover sheet, the cover sheet must be either inherently rupturable (such as a thin metallic foil) or a portion of the cover sheet (typically a plastic or plastic laminate sheet) must be weakened such that when normal hand force is applied the product will break or rupture the cover sheet sufficiently to permit the product to pass through the cover sheet.

A method to produce a rupturable plastic sheet includes mechanically scoring the plastic sheet such that a score line or groove is marked onto the sheet without completely penetrating the sheet. Another method is to score the plastic sheet using a laser to produce a score line or groove, which acts to form a rupturable site on the plastic sheet. Typically, such a plastic sheet is a multilayered laminate in which a laser-scorable layer is laminated to a non-laser scorable material such as a metallic foil or non-laser scorable polymer. It is believed that when a laser-scored top layer laminated or bonded to a bottom non-laser-scorable layer is ruptured, the resulting ruptured flaps will tend to curl due to the differing characteristics of the two layers.

There is a consumer need for packages which can hold individual products in blister packages, which are clear to show the product, which are openable without excessive noise, and which do not use metal foil which may shred and form irregular opening flaps. Incorporation of foil into a package reduces or eliminates recyclability of the package.

There is a demand by marketers for blister packages on which printed information and graphics may be placed on a clear package and easily observable even after some of the products are removed.

SUMMARY OF THE INVENTION

A rupturable multilayer sheet comprises a top and bottom layers having dual aligned laser scores and at least one non-laser scored intermediate layer. A blister package further comprises a blister with one open surface, a product incorporated in the blister, and a rupturable sheet sealed onto the blister open surface, wherein the rupturable sheet comprises a laminate comprising top and bottom layers having dual aligned laser scores and at least one non-laser scored intermediate layer. A process to form a blister package comprises laser scoring a multilayered polymeric laminate comprising laser scorable top and bottom layers and at least one non-laser scorable intermediate layer to form a rupturable cover sheet containing aligned laser scores on the top and bottom layers, and sealing a blister package containing a product in one or more blisters with the laser-scored cover sheet wherein the dual aligned laser scores are positioned above each blister.

BRIEF DESCRIPTION OF THE DRAWINGS

FIG. 4 illustrates a cross-section of a laser-scored blister package cover sheet of this invention, containing five laminated polymeric layers together with a printing layer, a top protective layer, and a bottom adhesive layer.

FIG. 5 illustrates a blister package with a laser-scored cover sheet.

FIG. 6 illustrates blister package cover sheets having various laser-score configurations.

DESCRIPTION OF THE INVENTION

Figure 1:
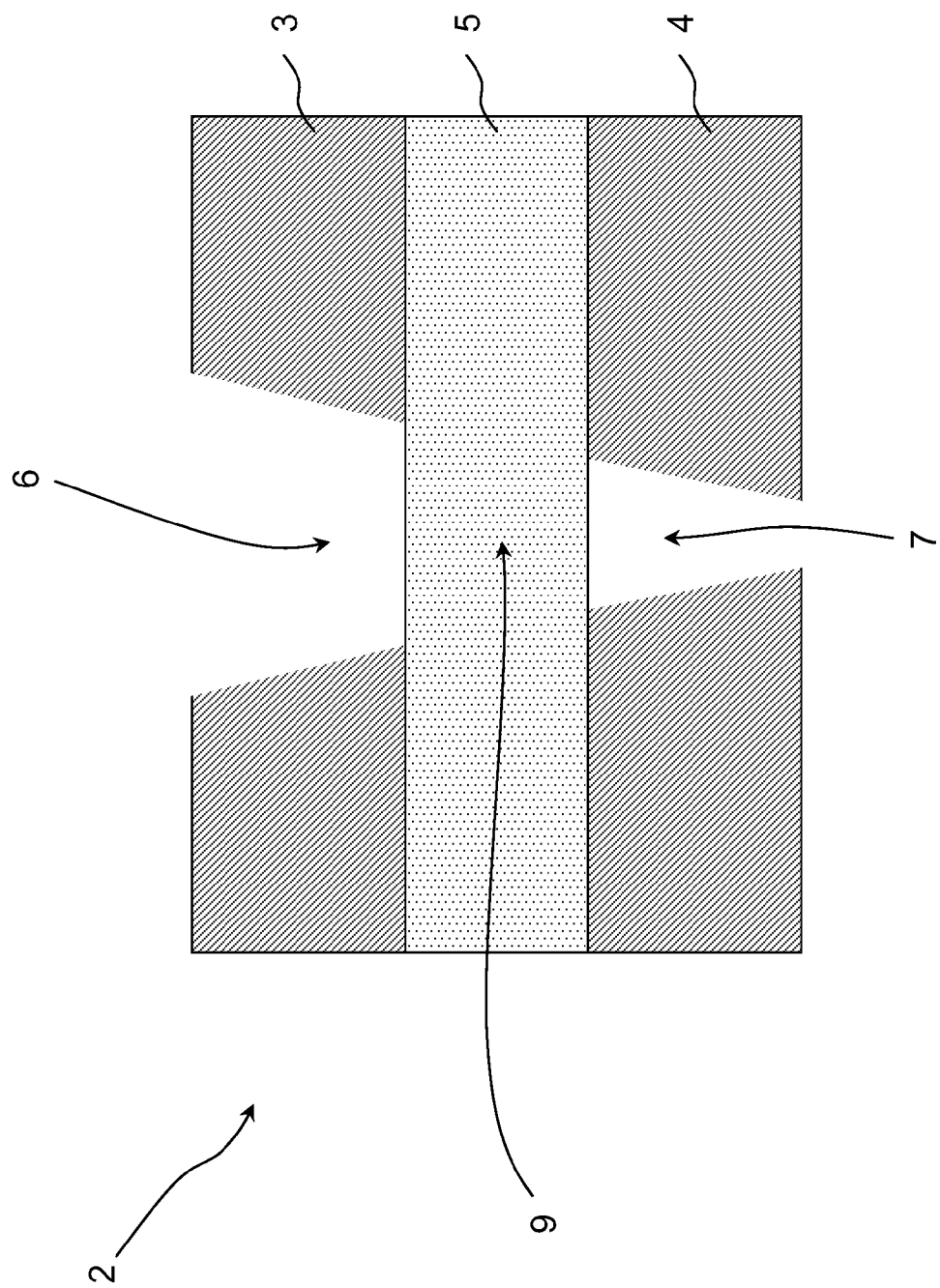
FIG. 1 illustrates a cross-section of a laser-scored blister package cover sheet of this invention, containing three laminated polymeric layers.

The blister package of this invention provides to a consumer a compact package to deliver a variety of products in which individual products are contained in a sealed blister or pocket which may be dispensed individually and hygienically by pushing the product through a rupturable cover sheet. The package preferably is formed from clear polymeric material which provides a marketer an ability to present printed information and graphics in a consumer-appealing fashion. The cover sheet is formed from polymeric material, which both provides an ability to have a clear material and opens without excessive noise. The cover sheet of this invention is preferably formed from a multilayered laminate in which the outer (top and bottom) structural layers are laser-scored such that the resulting dual laser scores are vertically aligned, while the intermediate layer (which may be formed from more than one individual layers) is not laser scored and provides a sealing or barrier layer.

In the blister package cover sheet of this invention, the primary top and bottom layers form a part of a structural component of the rupturable cover sheet of this invention. The top and bottom structural layers of this invention are laser scorable polymer materials. Laser scorable refers to an effect of directing a suitable laser beam onto the polymer material which causes a score line or indentation in the material. It is believed that the laser energy is absorbed by the polymer material, which results in creation of scoring. There may be thin layers of printing, protective coating (such as a varnish), and adhesive material adhered to the primary structural top and bottom layers. These may or may not be inherently laser scorable, but will be scored when the top and bottom structural layers are laser scored.

Preferably, the top and bottom layers have sufficient structural strength to form a suitable package for a consumer product. Further, these layers must be rupturable after laser scoring. A rupturable area in a cover sheet is capable of being readily opened or penetrated by hand pressure applied to a product to push the product through the cover sheet. Preferably, the structural bottom layer is compatible with the blister package material, which typically is a thermoformable polymer. These materials are compatible in the sense of have a capability of being adhered together and forming a suitable seal. Further, recyclability is increased if parts of the package are made from the same or similar materials.

In a rupturable blister package of this invention, typically after the product is removed or ejected from a closed blister by rupturing the cover sheet, resultant flaps of cover sheet material after rupturing tend to restore their position in the sheet. Although the sheet will have an opening after rupturing, typically the ruptured cover sheet material will lie in the plane of the cover sheet and will not protrude substantially above or below that plane. This property is in contrast to a metal foil rupturable cover sheet in which the ruptured foil does not naturally resume a position in the plane of the cover sheet. Consumers appreciate that a blister package, containing multiple blister-packaged products, in which some of the products have been removed, continue to have a well-ordered and neat appearance. The dual structural layers contained in this invention inhibit curling of ruptured cover sheet flaps and maintains a generally flat sheet material. Marketers appreciate that printing such as logos and product identifiers remain readable after some products are removed from a blister package array of this invention.

Consumers also appreciate a property of the blister package of this invention in that rupturing the package to obtain a product does not create objectionable noise. This property especially is important if a consumer attempts to remove a product in a location or in a circumstance in which unwanted noise is objectionable such as at a concert or a theatre.

Preferably, the blister package and blister package cover sheet materials are clear. Consumers appreciate an ability to observe the product before purchase or before releasing from the blister package. Printed information may be placed on the blister or blister package cover sheet, such as product identification, logos, and regulatory-required information. Typically, such printing may form separate layer placed above or below a primary structural layer. If a printing layer is placed on an outer surface of a blister package cover sheet, typically a thin protective layer (such as a varnish) preferably is applied over the printing layer.

Multilayer cover sheets of this invention typically are formed by co-extruding outer structural layers onto a co-extruded intermediate layer(s) as known in the art. Other printing, protective, and adhesive layers may be added as known in the art.

Laser-scorable polymers suitable for use as a primary structural layer useful in this invention include polyesters and polyvinyl chloride. These materials are especially preferred because of their structural strength and clarity. Of these, polyesters are the most preferred. Within polyesters, preferred materials are polyalkylene aromatic carboxylates, which are typically formed as condensation polymers of an aromatic dicarboxylic acid (such as terephthalic acid) and an alkylene diol (such as ethylene glycol). The most typical polyalkylene aromatic carboxylate is polyethylene terephthalate (PET). Other useful polyesters include polybutylene terephthalate (PBT) and polyethylene naphthalate (PEN) (formed from ethylene glycol and 2,6-naphthalene dicarboxylic acid). Mixtures of these polyesters also may be used.

The top and bottom primary structural layers typically (but not necessarily) are of the same polymeric material. In an embodiment of this invention, the bottom layer (in the sense of being the layer attached to the blister package) is a grade of PET which can be directly bonded to a PET blister package bottom without use of a separate adhesive layer. In this embodiment, the top layer may be another grade of PET or other suitable laser-scorable material.

Intermediate non-laser-scorable layers useful in this invention are selected to retain a package seal after the outer structural layers are laser scored. Non-laser-scorable as used in this invention means that laser energy at the levels used in the process of this invention, which scores the outer structural layers, passes through such non-scorable layers without significant effect to the structure of such layers (i.e. the intermediate layer(s) are not scored). The intermediate layers provide a package sealed against intrusion of unwanted foreign material even though the outer structural layers contain scores or grooves. Further, these intermediate layers may provide a barrier layer which inhibits transmission of water vapor, oxygen, carbon dioxide or other gases through the package cover sheet. Also, a barrier layer inhibits loss of volatile flavor components and increases effective shelf life of the product. A preferred example of an intermediate layer is ethylene vinyl alcohol copolymer (EVOH). Other intermediate layer materials are possible if they possess suitable properties of barrier strength and non-laser-scorability. EVOH is preferred due its superior gas barrier properties, clarity, and a property of transmission of laser energy used in this invention. In addition to one or more barrier layers (such as EVOH) additional layers of non-laser-scorable material may be included in a suitable intermediate layer. An example is covering an EVOH layer with layers of a polyolefin such as polyethylene (such as low density polyethylene) to provide better adhesion properties between the intermediate layer and the outer structural layers. In a preferred example an intermediate layer of EVOH coated with polyethylene is incorporated within outer layers of PET.

Lasers useful in this invention are selected to form score lines in a blister package cover sheet. A typical useful laser is a carbon dioxide laser, which emits a laser beam in the mid infrared electromagnetic spectrum, such as between about 8.8 to 10.9 $\mu m$ and usually about 10.6 $\mu m$. The energy output of a suitable laser preferably is controlled to create laser scoring in the outer primary structural layers of the cover sheet material of this invention, but pass through the non-laser scorable intermediate layers. A range of useful and optimum energy output levels may be determined by routine testing. A useful range typically may be between 10 and 1000 watts and more typically between 100 and 800 watts.

A package of this invention typically is formed as a blister containing a product, which is sealed by a rupturable cover sheet. A suitable blister is a pocket (typically made from a thermoformed polymer) which has an open surface surrounded by a rim surface on which a cover sheet may be adhered. Multiple blisters may be contained in a blister tray, such that an array of blisters (pockets) is arranged in a consumer-acceptable package. A typical polymer used for the blister pocket or blister tray is thermoformable and preferably is clear, such as polyesters and polyvinyl chloride. Polyesters such as PET are preferred. Preferably, the blister tray and bottom structural layer of the cover sheet of this invention are made from the same or compatible polymers. The most preferable blister package of this invention is made from polyesters for both the tray and the outer structural layers of the cover sheet. In an embodiment of this invention, a secondary member, such as made from paperboard or cardboard, may be fitted around or onto the blister or array of blisters. A typical blister package of this invention may be contained in a secondary package, such as made from cardboard.

In the present invention, a blister package cover sheet is laser scored to create a rupturable sealing layer. Typically, the cover sheet is laser scored along a line or multiple lines which are or will be located within a blister open surface. In this embodiment, a blister opening (typically the open surface of a thermoformed pocket) is covered with a cover sheet which is laser-scored to form a rupturable area above such opening.

In an embodiment, a blister package cover sheet is laser scored along multiple lines for each blister. Typically, a single straight laser-scored line does not provide sufficient rupturable capability to the cover sheet to permit easy rupture by applying pressure to an enclosed product. Preferably, multiple laser-scored lines are crossed such that upon rupturing multiple flaps of cover sheet material are created, which permit easy removal of the product from the covered blister. For example, the multiple lines may be configured in a cross, multiple crosses, X or T shapes. In a preferred embodiment, the laser scoring is in a W or M or U pattern, which will form flaps when ruptured.

In an embodiment of this invention, laser-scored lines are configured with at least one discontinuity in one or more lines. The discontinuity forms a small region which is attached to and continuous with the cover sheet outer surfaces and provides structural integrity for product protection to the rupturable cover sheet. Without such regions, there may be premature or unintentional rupturing of the cover sheet during normal handling of a blister package. The region should be sufficiently small as to permit easy tearing when the cover sheet is intentionally ruptured by pressing a product through the rupturable cover sheet. An example of such a laser-scored line configuration with such a region appears as a pair of V-shaped scores with a discontinuous region or spot at the apex of the adjoining V's. A region of about 0.5 to 2 mm, preferably about 1 mm, in diameter is typically sufficient to maintain structural integrity of the cover sheet, while permitting easy rupturing when intended. Other shapes are possible, which contain multiple laser-scored lines with discontinuous regions in accordance with the description of this invention.

A rupturable blister cover sheet of this invention permits a product to be removed from a blister package typically by pushing the product through a rupturable region in the cover sheet. The rupturable region is produced by forming laser scores onto the sheet. The force necessary to push a product through these rupturable regions typically is less than 4 kg-force, typically less than 3 kg-force and preferably less than 2.75 kg-force. The force necessary to push a product through a cover sheet of this invention typically is between 1 and 3 kg-force and preferably between 2 and 2.75 kg-force.

Any product suitable for incorporation into a blister package may be incorporated into the package of this invention. Typically a suitable product should be small enough to be conveniently incorporated into a blister package and have a sufficient structural strength to permit such a product to be pushed through a rupturable cover sheet. The product may be in any suitable shape such as a ball, pellet, lozenge, tablet, capsule, pill, and the like. Specific examples include edible items such as gum, candy, and confections; pharmaceutical products; and inorganic products. Other suitable products include pellet gum, stick gum, tab gum, bubble gum, soft candy, chewy candy, hard candy, mints, and chocolate.

Rupturable cover sheets of this invention typically are of sufficient thickness to provide structural integrity but thin enough to provide an ability to become rupturable. A suitable cover sheet may be at least 0.01 mm thickness and preferably at least 0.04 mm thickness. Suitable cover sheets may be up to 1 mm or more in thickness if an especially strong package is desired. Preferable suitable cover sheets may be less than 0.5 mm and more preferably less than 0.1 mm. The outer structural laser scorable layers typically are within 20% (preferably 10% and more preferably 5%) of the same thickness. In a typical cover sheet the thicknesses of the outer structural layers are essentially the same. The proportion of the intermediate non-laser-scorable layer typically is between 5 and 25% of the total cover sheet thickness. In a preferable cover sheet the proportion of the intermediate layer to total sheet thickness is 10 to 20%. Other proportions may be used.

The blister package cover sheets of this invention may be produced by directing a laser beam onto a multilayered polymeric sheet in which the outer layers are laser-scorable polymeric material and the intermediate layer (which may be formed from multiple individual layers) is non-laser-scorable. In practice the laser beam scores the top layer, passes through the intermediate layer, and scores the bottom layer. Preferably, a laser reflective material is placed underneath the sheet to reflect the laser beam back onto the bottom outer layer. The laser beam is directed to form a desired configuration or pattern of laser scoring. The resultant cover sheet material has dual laser scores on the outer (top and bottom) structural layers, which are aligned vertically. Thus, the laser score pattern on the top and bottom layers will be identical and aligned to permit easy rupturing of the cover sheet material. The laser-scored cover sheet may be placed onto a blister or blister array in a package in which each blister contains a product. The cover sheet should be positioned or registered such that the laser-scored regions are placed over the open surface of each blister.

In another embodiment, a blister package may be assembled in which each blister contains a product and covered with a multilayered cover sheet of this invention before laser scoring. After assembly, a suitable laser scores the cover sheet.

Embodiments of this invention are further illustrated, but not limited by, reference to the Figures.

FIG. 1 illustrates a cross-section of a laser-scored blister package cover sheet of this invention 2, containing three laminated polymeric layers 3, 4, and 5. Structural outer layers 3 and 4 are formed from a laser-scorable polymer such as PET, while layer 5 is a non-laser-scorable intermediate barrier polymer such as EVOH. Laser scores 6 and 7 are vertically aligned to produce a rupturable region 9.

Figure 2:
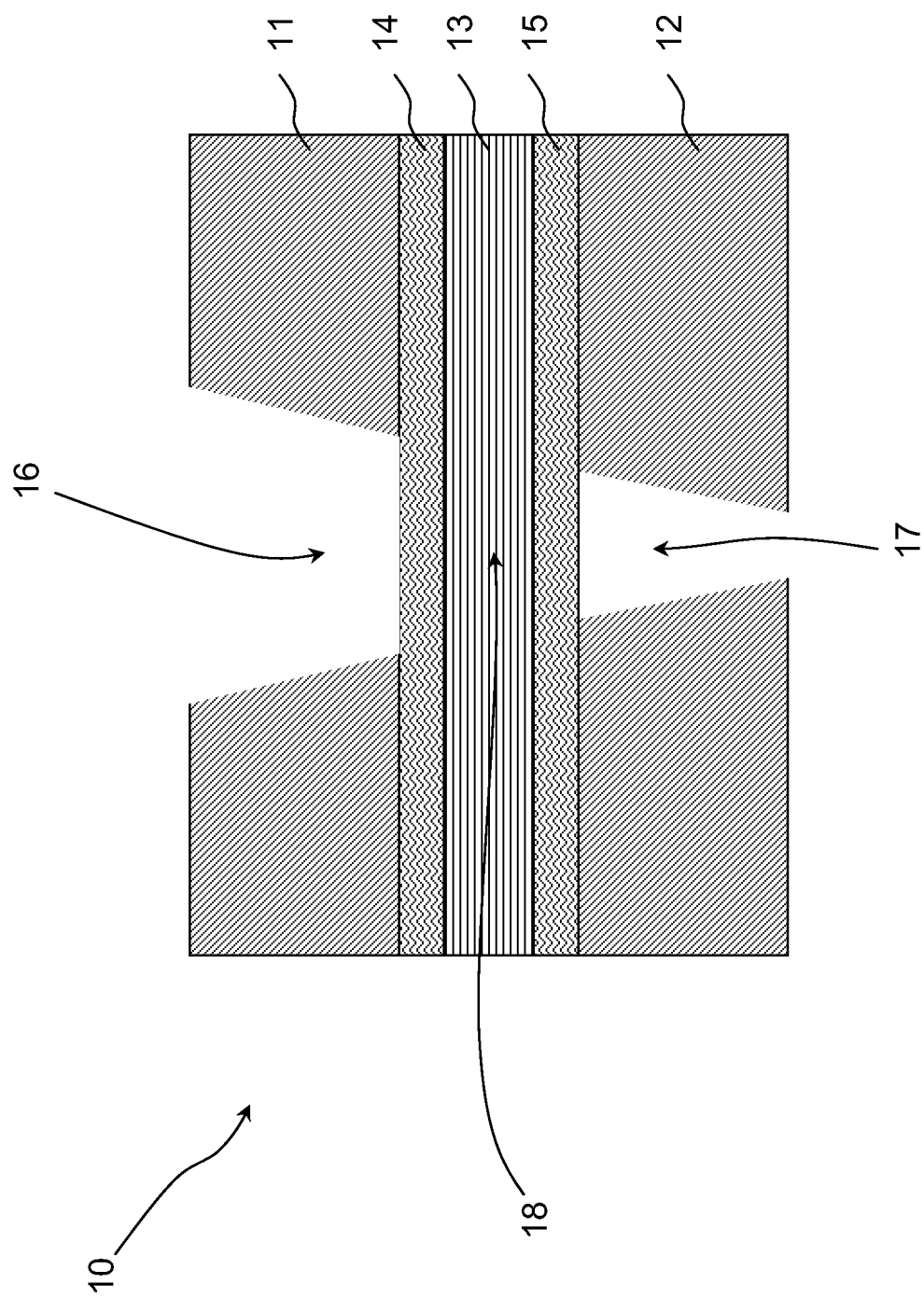
FIG. 2 illustrates a cross-section of a laser-scored blister package cover sheet of this invention, containing five laminated polymeric layers.

FIG. 2 illustrates a cross-section of a laser-scored blister package cover sheet of this invention 10, containing five laminated polymeric layers. Structural outer layers 11 and 12 are formed from a laser-scorable polymer such as PET, while layer 13 is a non-laser-scorable intermediate barrier polymer such as EVOH, which is interspaced between two layers of polyethylene 14 and 15 to form a better bond between the outer and intermediate layers. Laser scores 16 and 17 are vertically aligned to produce a rupturable region 18.

Figure 3:
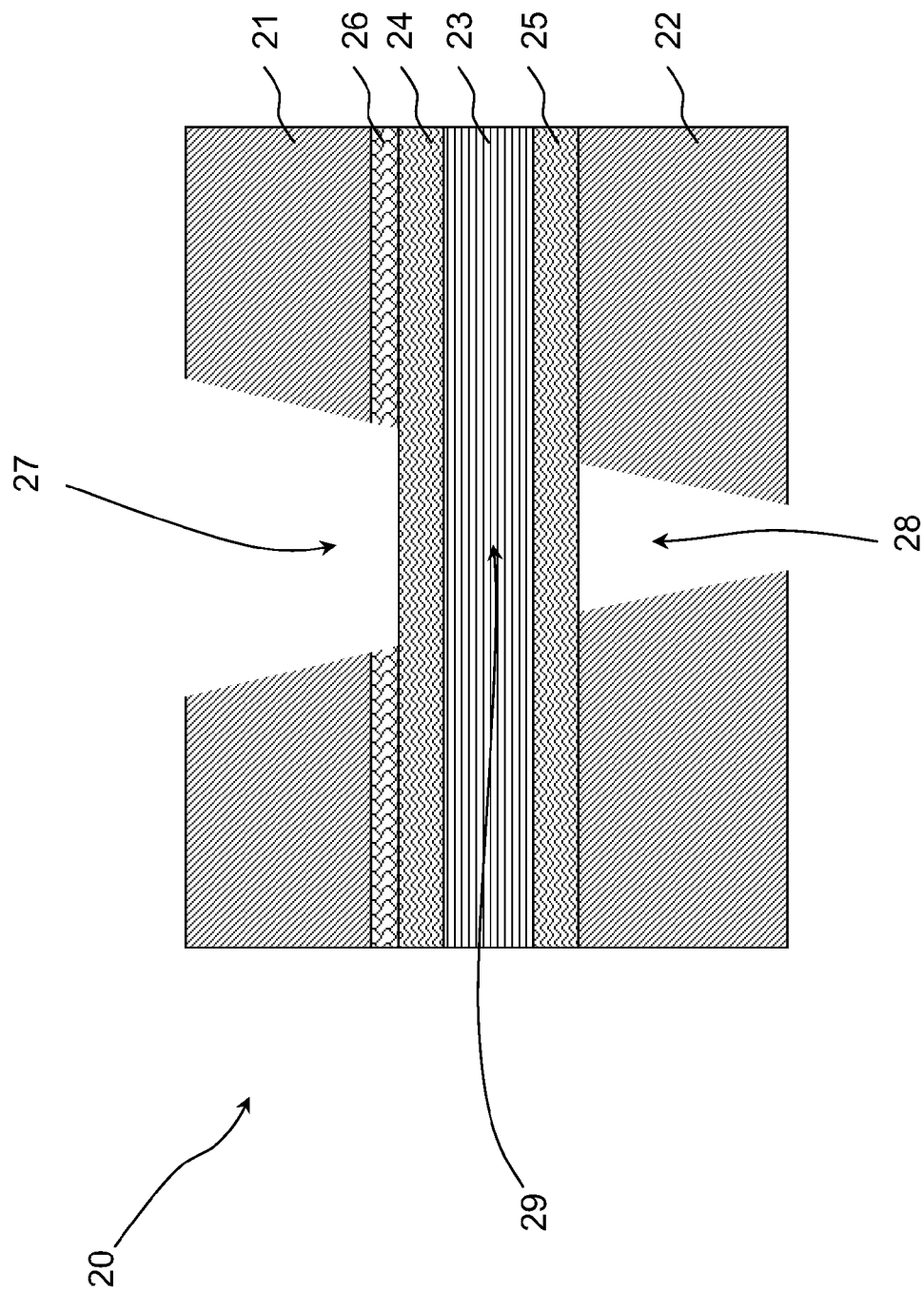
FIG. 3 illustrates a cross-section of a laser-scored blister package cover sheet of this invention, containing five laminated polymeric layers together with a printing layer.

FIG. 3 illustrates a cross-section of a laser-scored blister package cover sheet of this invention 20, containing five laminated polymeric layers together with a printing layer. Structural outer layers 21 and 22 are formed from a laser-scorable polymer such as PET, while layer 23 is a non-laser-scorable intermediate barrier polymer such as EVOH, which is interspaced between two layers of polyethylene 24 and 25 to form a better bond between the outer and intermediate layers. A printing layer 26 is placed onto the underside of outer layer 21. Laser scores 27 and 28 are vertically aligned to produce a rupturable region 29.

FIG. 4 illustrates a cross-section of a laser-scored blister package cover sheet of this invention 30, containing five laminated polymeric layers together with a printing layer 36, a top protective layer 37, and a bottom adhesive layer 38. Structural outer layers 31 and 32 are formed from a laser-scorable polymer such as PET, while layer 33 is a non-laser-scorable intermediate barrier polymer such as EVOH, which is interspaced between two layers of polyethylene 34 and 35 to form a better bond between the outer and intermediate layers. A printing layer 36 is placed onto the top side of outer layer 31 and a protective varnish layer 37 covers the printing. An adhesive layer (such as an adhesive lacquer) 38 is placed on the bottom of the lower outer layer 32 to adhere to a blister package. Laser scores 39 and 40 are vertically aligned to produce a rupturable region 41.

FIG. 5 illustrates a blister package 50 with a laser-scored cover sheet. The patterns shown are illustrative in that a typical blister package would have the same scoring pattern for each blister pocket. Cover sheet 54 is adhered to a blister tray 60 containing individual blister pockets 52 by adhering to rims 56 which surround blister openings 64. Each blister opening has a patterned laser scorings 70, 72, 74, and 76. Laser scoring patterns 70, 74, and 76 illustrate an embodiment of this invention in which the score lines are discontinuous to form rupturable regions 71, 75, and 77, which are continuous with the outer layers of the cover sheet 54.

FIG. 6 illustrates blister package cover sheets having various laser-score configurations. Sheet 80 shows an inverted V laser score 82 pattern area 84 represents a clear portion of the cover sheet, which the remainder area may contain printing and graphics. Sheet 90 illustrates a laser score pattern which does not contain discontinuous score lines, which should be rupturable due to a W and U shape pattern.

What is claimed is:

1. A rupturable cover sheet for a blister package, the rupturable cover sheet comprising:
   a top outer layer having a first laser score;
   a bottom outer layer having a second laser score that is narrower than the first laser score; and
   at least one non-laser scored intermediate layer disposed between the top and bottom outer layers, wherein the first and second laser scores are vertically aligned with each other, wherein the first laser score extends completely through the top outer layer and the second laser score extends completely through the bottom outer layer, and wherein the at least one non-laser scored intermediate layer is made from a different material than a material of the top outer layer and a material of the bottom outer layer.

2. A rupturable cover sheet of claim 1 in which the top and bottom outer layers comprise a polyalkylene aromatic carboxylate.

3. A rupturable cover sheet of claim 1 in which the top and bottom outer layers comprise polyethylene terephthalate, polybutylene terephthalate, polyethylene naphthalate, or mixtures thereof.

4. A rupturable cover sheet of claim 1 wherein the at least one non-laser scored intermediate layer comprises a foil free barrier layer.

5. A rupturable cover sheet of claim 1 wherein the at least one non-laser scored intermediate layer comprises ethylene vinyl alcohol copolymer.

6. A rupturable cover sheet of claim 1 wherein the at least one non-laser scored intermediate layer comprises a layer of ethylene vinyl alcohol copolymer and two layers of a polyolefin, wherein the layer of ethylene vinyl alcohol copolymer is disposed between the two layers of a polyolefin.

7. A rupturable cover sheet of claim 1 wherein the at least one non-laser scored intermediate layer comprises a layer of ethylene vinyl alcohol copolymer and two layers of a polyethylene, wherein the layer of ethylene vinyl alcohol copolymer is disposed between the two layers of a polyethylene.

8. A rupturable cover sheet of claim 1 wherein the top and bottom outer layers are covered with one or more layers selected from a printing layer, a varnish layer, and an adhesive layer.

9. A rupturable cover sheet of claim 1 having more than one laser score line on each of the top and bottom outer layers.

10. A rupturable cover sheet of claim 9 having at least one discontinuous score line.

11. A rupturable cover sheet of claim 10 wherein the discontinuous score line forms a rupturable region continuous with the outer layers of the cover sheet.

12. A rupturable cover sheet of claim 9 having multiple score lines configured in a cross, multiple crosses, X, T, W, or M shapes.

13. A rupturable cover sheet of claim 1 including at least one laser score line in a U shape.

14. A blister package comprising
   a) at least one blister having an open surface,
   b) a product incorporated in the at least one blister, and
   c) a rupturable cover sheet sealed onto the blister open surface, wherein the rupturable cover sheet comprises a multilayer polymeric laminate comprising:
      a top outer layer including a first laser score;
      a bottom outer layer including a second laser score that is narrower than the first laser score; and
      at least one non-laser scored intermediate layer disposed between the top and bottom outer layers, wherein the first and second laser scores are vertically aligned with each other, wherein the first laser score extends completely through the top outer layer and the second laser score extends completely through the bottom outer layer, wherein the first and second laser scores are positioned above the blister open surface, and wherein the at least one non-laser scored intermediate layer is made from a different material than a material of the top outer layer and a material of the bottom outer layer.

15. A blister package of claim 14 in which the at least one blister is thermoformed into a blister tray.

16. A blister package of claim 15 in which the blister tray and the top and bottom outer layers are polyester.

17. A blister package of claim 15 in which the at least one non-laser scored intermediate layer contains ethylene vinyl alcohol copolymer.

18. A blister package of claim 16 in which the product is a gum, candy, or confection.

19. A process to form a blister package comprising:
   a) laser scoring a multilayered polymeric laminate comprising laser scorable top and bottom layers and at least one non-laser scored intermediate layer disposed between the top and bottom layers to form a rupturable laser-scored cover sheet that includes first laser scores on the top layer vertically aligned with second laser scores on the bottom layer, wherein the first laser scores extend completely through the top layer and the second laser scores extend completely through the bottom layer, wherein the first and second laser scores are formed simultaneously, and wherein the at least one non-laser scored intermediate layer is made from a different material than a material of the top layer and a material of the bottom layer, and
   b) sealing a blister package containing a product in one or more blisters with the multilayered polymeric laminate, wherein the aligned first and second laser scores in the rupturable laser-scored cover sheet are positioned above each blister.

20. A process of claim 19 wherein the multilayered polymeric laminate is laser scored after the multilayered polymeric laminate is sealed onto the blister package.

* * * * *